No. 766,769. PATENTED AUG. 2, 1904.
F. PATEE.
MOTOR VEHICLE.
APPLICATION FILED AUG. 10, 1903.
NO MODEL.
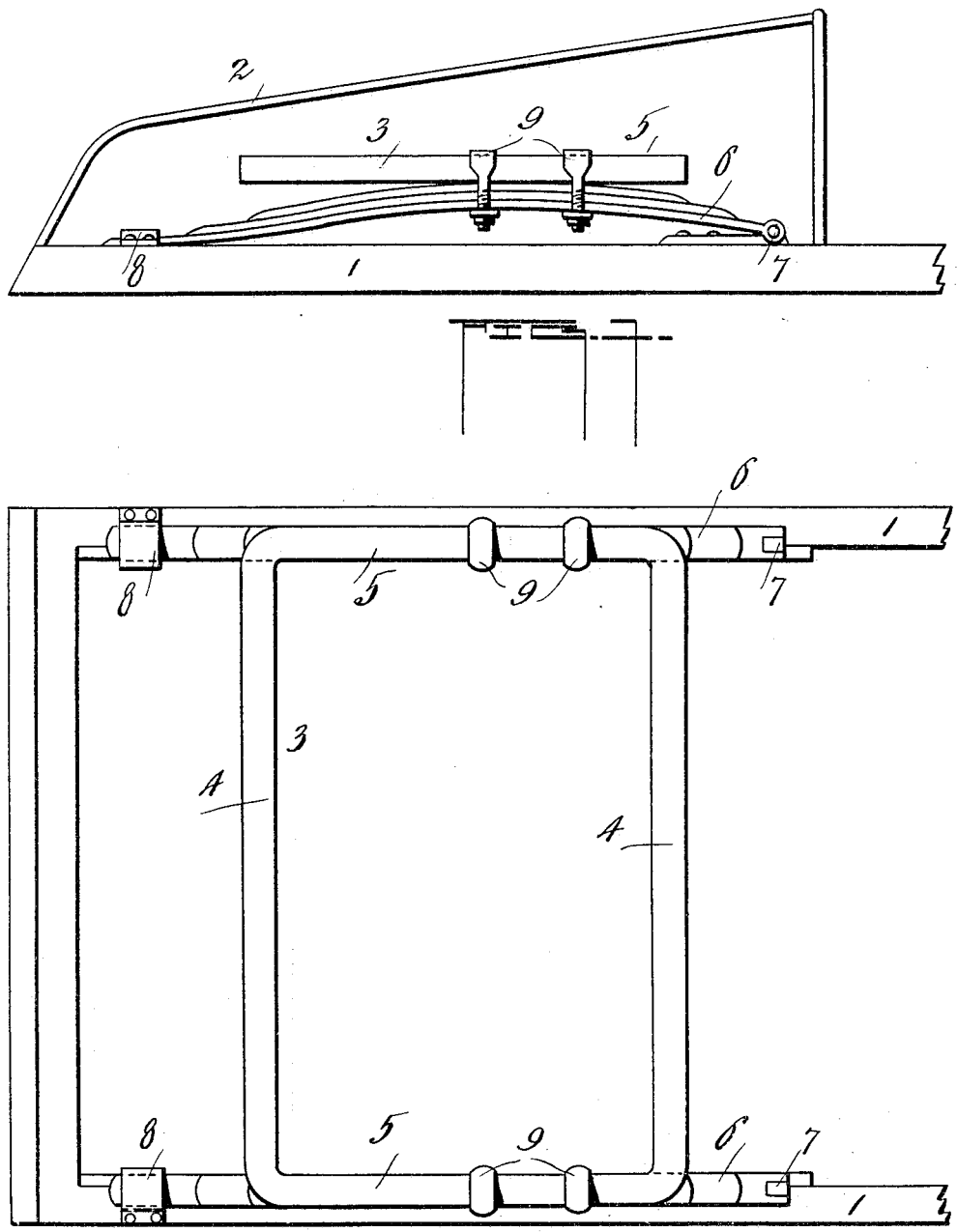
Witnesses:
Inventor,
Fred Patee
By Thos. W. LaPorte,
Atty.

No. 766,769. Patented August 2, 1904.

UNITED STATES PATENT OFFICE.

FRED PATEE, OF MILWAUKEE, WISCONSIN.

MOTOR-VEHICLE.

SPECIFICATION forming part of Letters Patent No. 766,769, dated August 2, 1904.

Original application filed September 4, 1902, Serial No. 122,095. Divided and this application filed August 10, 1903. Serial No. 168,897. (No model.)

*To all whom it may concern:*

Be it known that I, FRED PATEE, a citizen of the United States, residing at Milwaukee, in the county of Milwaukee and State of Wisconsin, have invented certain new and useful Improvements in Motor-Vehicles; and I do hereby declare that the following is a full, clear, and exact description of the invention, which will enable others skilled in the art to which it appertains to make and use the same.

This invention has reference to improvements in motor-vehicles, and has special reference to a resilient motor-frame support therefor.

This application is a division of the application filed by me on September 4, 1902, bearing Serial No. 122,095, for motor-vehicles.

The object of the present invention is a skeleton frame-support for the suspension of the motor in the body of a vehicle, said frame-support mounted on springs for the purpose of absorbing the vibration of the motors independent of the springs of the vehicle, one end of the springs fixed relative to their position on the vehicle-frame, but pivotally secured, the opposite ends mounted to reciprocate to permit the springs to operate without jar or vibration to the frame of the vehicle.

In the drawings, Figure 1 is a view in side elevation of the forward end of a vehicle, showing interior of a bonnet and my resilient frame supported on the sills thereof. Fig. 2 is a plan of parts seen in Fig. 1 with the bonnet removed.

No attention is made to the particular form of vehicle-frame nor to the ground-wheel support therefor, as the devices herein are not dependent on such detail construction and are applicable to any of the well-known vehicles in this class.

Referring to the drawings, 1 indicates the usual side bars or sills for supporting a vehicle-body and having mounted on the forward end of the body the bonnet 2. The bonnet may or may not be used, depending entirely on the form of the engine or motor structure.

The motor suspension-support to which my invention relates comprises a skeleton frame 3, of suitable material and form, having the forward and rear cross parallel frame parts 4 and the longitudinal frame parts 5. This support or frame is carried on semi-elliptic springs 6, lying above and parallel with the sills 1 of the vehicle, and their inner ends are substantially fixed relative to their position on the frame, but having a pivotal connection at 7 with the sills or suitable frame parts attached to said sills, and the forward ends of said springs are slidably carried through loops, castings, or similar devices 8, attached to the sills of the vehicle in manner shown, and 9 indicates suitable straps for fastening the support 3 to the springs.

It is intended, as shown and described in the application referred to, of which this application is a division, to suspend the motors or engine from the frame 3 by means of suitable hangers or equivalent devices.

It is obvious that various changes may be made and that details may be resorted to without departing from the principle and scope of invention herein.

What I claim is—

1. In a motor-vehicle, the combination with the sills thereof, of semi-elliptic springs mounted longitudinally thereon, one end pivoted to the sills and their opposite ends longitudinally slidable by compression, a skeleton frame supported by said springs, and straps for securing the frame to the springs, for the purposes set forth.

2. The combination with a motor-vehicle and the sills thereof, of means for supporting a motor, comprising a skeleton frame, and flat springs secured to the frame and connected to the sills acting as draw-bars between the motor and the vehicle.

In testimony whereof I affix my signature in presence of two witnesses.

FRED PATEE.

Witnesses:
 THEO. JONAS,
 HUBERT SCHLOEMER.